Patented July 15, 1952

2,603,647

UNITED STATES PATENT OFFICE 2,603,647

PREPARATION OF 2-MERCAPTO THIAZOLES

James T. Gregory, Akron, Ohio, assignor to The B. F. Goodrich Company, New York, N. Y., a corporation of New York No Drawing. Application October 18, 1951, Serial No. 251,996

3 Claims. (Cl. 260—302)

This invention relates to a novel reaction of alpha-thiocyano carbonyl compounds and more particularly pertains to the reaction of alpha-thiocyano carbonyl compounds with hydrogen sulfide whereby a 2-mercaptothiazole is formed.

I have discovered that an alpha-thiocyano carbonyl compound; that is, an aldehyde or ketone having a thiocyano group attached to the carbon atom immediately adjacent to the carbonyl carbon of the aldehyde or ketone, will react with hydrogen sulfide under elevated temperatures and pressure to produce a 2-mercaptothiazole by splitting out water during ring closure. This reaction takes place as follows:

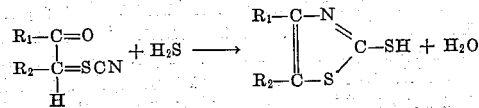

wherein $R_1$ and $R_2$ comprise the non-reactive residue of the thiocyano carbonyl. Generally $R_1$ and $R_2$ are hydrogen or hydrocarbon radicals containing from 1 to 10 carbon atoms.

This novel reaction provides a new method for preparing 2-mercaptothiazoles. It is a particularly useful process and has many advantages over the prior art methods for preparing 2-mercaptothiazoles. The methods for preparing 2-mercaptothiazoles disclosed by the prior art which have been employed in large scale industrial preparations of 2-mercaptothiazoles involve the use of chlorinated reactants, especially alpha-chloroketones. These chloroketones are, in general, lachrymators and cause no little discomfort when, through leaks in the processing equipment, they escape to the atmosphere in which the chemical operators work. Also these chloroketones attack many of the materials employed in making gaskets, and, therefore, not only require the use of special gasket materials but also enhance the opportunities for leaks. In addition, the chloroketones, when by chance they come into contact with skin, cause burning which results in quite painful slow healing blistering of the skin. The alpha-thiocyano carbonyl compounds employed as reactants in the process of this invention do not possess any of the above-described undesirable properties.

Furthermore the manufacture of the chloro-ketones employed by the prior art, requires the use of elemental chlorine. In times of a short supply of elemental chlorine, such as during a period of national emergency and/or during a period of rapid expansion in the chemical industry, it is essential that elemental chlorine is not diverted from critical uses where no substitute exists for this versatile element. However the 2-mercaptothiazoles also are extremely important to industry, especially the rubber industry, where these thiazole derivatives are employed in large quantities as accelerators for the vulcanization of natural and synthetic rubber compositions. Hence the present discovery of a nonchlorinated reactant which can be employed in the preparation of these important thiazole derivatives aids in releasing chlorine for the preparation of other essential products and provides a means for supplying the rubber industry with these much used accelerators.

In the process of this invention there can be employed any alpha-thiocyano carbonyl compound. Such a compound, will of course, contain the structure

and will have only the one oxygen attached to the carbonyl carbon atom, that is, it will be an alpha-thiocyano ketone or aldehyde. Ordinarily it will contain, in addition to the carbonyl oxygen atom and the nitrogen and sulfur atoms of the thiocyano group, only carbon and hydrogen atoms as when it possesses the structure

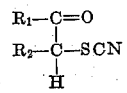

wherein $R_1$ and $R_2$ are hydrogen or hydrocarbon groups; however, $R_1$ and $R_2$ may also be radicals containing elements other than carbon and hydrogen present in non-reactive structure, as, for example, oxygen in ether linkages, sulfur in thioether linkages, nitrogen and oxygen in nitro groups, etc. All such thiocyano aldehydes and ketones are known types of compounds and can be readily prepared by the reaction of thiocyanogen with an aldehyde or ketone as follows:

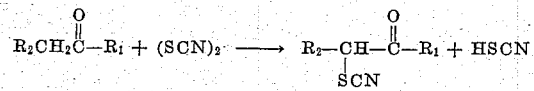

As examples of alpha-thiocyano carbonyl compounds which are suitable reactants for the process of this invention, there may be mentioned such alpha-thiocyano-aldehydes as thiocyano-acetaldehyde, alpha-thiocyano-n-propionaldehyde, alpha-thiocyano-n-butyraldehyde, alpha-thiocyano-n-valeraldehyde, alpha-isopropyl-alpha-thiocyano-acetaldehyde, alpha-benzyl-alpha-thiocyano-acetaldehyde, alpha-phenyl-alpha-thiocyano-acetaldehyde, alpha-naphthyl-alpha-thiocyano-acetaldehyde, alpha-cyclohexyl-alpha-thiocyano-acetaldehyde, alpha-thiocyano-alpha-ethoxy acetaldehyde, alpha-thiocyano-beta-chlorobutyraldehyde, and alpha-thiocyano-beta-ethoxy butyraldehyde; and such alpha-thiocyano ketones as for example 3-thiocyano-propanone-2; 3-thiocyano-butanone-2; 3-thiocyano-pentanone-2; 3-thiocyano-hexanone-2; 3-thiocyano-heptanone-2; 3-phenyl-3-thiocyano-propanone-2; 3-cyclohexyl-3-thiocyano-propanone-2; 4-phenyl-3-thiocyano-butanone-2; 5-phenyl-3-thiocyano-pentanone-2; 6-phenyl-3-thiocyano-hexanone-2; 3-naphthyl-3-thiocyano-propanone-2; 5-p-tolyl-3-thiocyano-pentanone-2; 3-thiocyano-4-pentenone-2; 2-thiocyano-pentanone-3; 2-thiocyano-hexanone-3; 1-thiocyano-hexanone-2; alpha-thiocyano propiono phenone; 1-phenyl-3-thiocyano-butanone-2; 1-phenyl-4-thiocyano-pentanone-3; alpha-thiocyano-propiononaphthone; 4-thiocyano-hexanone-3; 3-thiocyano-heptanone-4; 2-thiocyano-octanone-3; alpha-thiocyano pentano phenone; 1-phenyl-3-thiocyano-pentanone-2; 1-phenyl-4-thiocyano-hexanone-3; alpha-thiocyano pentano naphthone; 5-thiocyano-1-heptanone-4; 1-cyclohexyl-1-thiocyano-propanone; 1-cyclohexyl-2-thiocyano-propanone; 1-cyclohexyl-2-thiocyano-butanone; 1-methoxy-3-thiocyanobutanone-2; 1-(methylthio)-3-thiocyanobutanone-2; 2-thiocyano-1-isopropoxy-butanone-3; 2-thiocyano-1-(isopropyl-thio)-butanone-3; 2-thiocyano-1-ethoxy-butanone-3; 2-thiocyano-1-(ethyl-thio)-butanone-3; 2-thiocyano-1-o-nitrophenyl-butanone-3; 2-thiocyano-1,5-di-phenyl-6-nitrohexanone-3; 3-thiocyano-1-butoxy-2-methyl-hexanone-4; 4-thiocyano-1-ethoxy-5-methylhexanone-3; 2-thiocyano-cyclopentanone; 2-thiocyano-cyclo-hexanone; 2,5-di(thiocyano)-1,4-cyclohexanedione; 2,3-di(thiocyano)-1,4-cyclohexanedione; 2,3-di(thiocyano)-1,4-pentanedione; 2,5-di(thiocyano)-1,6-decanedione; and 2-(alpha-thiocyanoacetonyl)-cyclohexanone.

Although any alpha-thiocyano carbonyl compound containing the structure hereinbefore set forth can be employed as a reactant according to the process of this invention, the alpha-thiocyano ketones, wherein $R_1$ in the general formula is a hexanedione; 2,3-di(thiocyano)-1,4-pentanedibecause at present they are more readily available.

A more detailed description of the process of this invention is as follows: a thiocyano carbonyl compound is charged to a pressure reactor capable of withstanding internal working pressures of 2000 to 10,000 pounds per square inch or higher at temperatures from 50° to 150° C. Hydrogen sulfide is then charged into the reactor, the reactor sealed and heated to the desired temperature, generally 50° C. to 150° C. The quantity of $H_2S$ employed can be varied. However, there should be present at least equimolecular portions of $H_2S$ and the thiocyano carbonyl and preferably from 2 to 5 moles of $H_2S$ per mole of the thiocyano carbonyl. The reactants are kept in admixture until the reaction is complete which is indicated by a decrease in pressure even though the reaction temperature increases. In general the pressure at which the reaction is carried out will vary from 1,000 to 10,000 pounds per square inch but the preferred pressure is from 2,000 to 3,000 pounds per square inch. The product will be in a solid crystalline form and can be removed from the reactor by scraping or by dissolving the product with a solvent after removal of unreacted $H_2S$ or an inert reaction diluent such as ethanol can be added to the reactor with the thiocyano carbonyl reactant. In this case the product will be in a slurry which can be easily removed from the reactor and readily filtered to recover the product or a solvent for the thiazole can be added to the reactor before the $H_2S$ is charged and in this case the product will be in solution and can be recovered by crystallization or by removal of the solvent by evaporation.

The following specific example will further illustrate the process of this invention.

EXAMPLE 1

There was charged to a stainless steel reactor containing 160 parts by weight of ethanol, 65 parts of 3-thiocyanobutanone-2. The reactor was sealed. Then $H_2S$ was charged under pressure through a charging line into the reactor until the internal pressure was 640 pounds per square inch gage. The reaction mixture was agitated and heated to 50° C. The pressure in the reactor rose to 4,000 p. s. i. Since this pressure exceeded the working pressure of the reactor, $H_2S$ was bled out to reduce the internal pressure to 2,700 p. s. i. at which time the internal temperature had increased to 71° C. Two hours later the temperature had reached a maximum of 78° C. and the pressure dropped to 2,100 p. s. i. The reactor was cooled and the unreacted $H_2S$ removed. A semi-solid mush of ethanol and crystalline solid was removed from the reactor and heated to remove the ethanol. The solid product was dissolved in hexane and recovered by crystallization. The product recovered from the hexane solution was dissolved in hot ethanol and the solution was decolorized with activated charcoal. A small amount of ethanolic solution containing about 4% by weight of HCl was added to the decolorized solution and the entire solution was concentrated by removal of ethanol to recover the product in a pure form. In this manner a yellow crystalline product having the characteristic odor of a 2-mercaptothiazole was recovered. This purified product had a melting point of 161° to 165° C. This product was identified as 2-mercapto-4,5-dimethylthiazole.

The following examples in tabular form are presented to illustrate the variety of 2-mercaptothiazoles which can be prepared according to the process herein disclosed.

Table 1

PRODUCTS OF REACTION OF H₂S WITH A THIOCYANO CARBONYL COMPOUND

| Example No. | Thiocyano Carbonyl | Product |
|---|---|---|
| 2 | 1-thiocyanobutanone-2 | 2-mercapto-4-ethylthiazole. |
| 3 | Thiocyano acetaldehyde | 2-mercaptothiazole. |
| 4 | Alpha-thiocyano propionaldehyde | 2-mercapto-5-methylthiazole. |
| 5 | 2-isopropyl-2-thiocyano acetaldehyde | 2-mercapto-5-isopropylthiazole. |
| 6 | 2-phenyl-2-thiocyano acetaldehyde | 2-mercapto-5-phenylthiazole. |
| 7 | 3-thiocyano hexanone-2 | 2-mercapto-5-propyl-4-methyl-thiazole. |
| 8 | 4-phenyl-3-thiocyano-butanone-2 | 2-mercapto-5-benzyl-4-methyl-thiazole. |
| 9 | 2-thiocyano-heptanone-5 | 2-mercapto-4-methyl-5-n-butylthiazole. |
| 10 | Alpha-thiocyano propionophenone 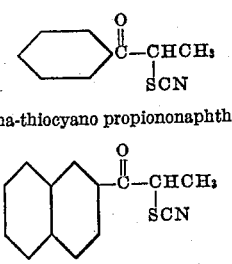 | 2-mercapto-4-methyl-5-phenylthiazole. |
| 11 | Alpha-thiocyano propiononaphthone | 2-mercapto-4-naphthyl-5-methyl-thiazole. |
| 12 | 3-thiocyano-octanone-4 | 2-mercapto-4-butyl-5-ethyl-thiazole. |
| 13 | 1-phenyl-4-thiocyano hexanone-3 | 2-mercapto-4-phenethyl-5-ethyl-thiazole. |
| 14 | 5-thiocyano-1-heptanone-4 | 2-mercapto-4-allyl-5-ethyl-thiazole. |
| 15 | 3-thiocyano-4-hexenone-2 | 2-mercapto-4-methyl-5-allyl-thiazole. |

Any of the other thiocyano carbonyl compounds of the class hereinbefore defined can be employed as a reactant in place of those employed in the above examples to produce corresponding 2-mercaptothiazoles.

Although I have illustrated my invention with the preparation of certain specific 2-mercaptothiazoles employing specific thiocyano carbonyls, I do not thereby desire or intend to limit myself solely thereto, for as hitherto stated other of the thiocyano carbonyl reactants of the class herein defined can be employed and the precise proportions of the reactants can be varied, if desired, without departing from the spirit and scope of this invention as defined in the appended claims.

I claim:
1. The method which comprises reacting at an elevated pressure and at a temperature of from 50° to 150° C. an alpha-thiocyano carbonyl compound with hydrogen sulfide thereby to form a 2-mercaptothiazole.
2. The method which comprises reacting at an elevated pressure and at a temperature of from 50° to 150° C. an alpha-thiocyano carbonyl compound having the structure

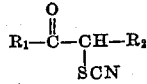

wherein R₁ and R₂ are members selected from the class consisting of hydrogen and hydrocarbon groups containing 1 to 10 carbon atoms, with hydrogen sulfide thereby to form a 2-mercaptothiazole, and recovering said thiazole.
3. The method which comprises reacting at a pressure of from 1,000 to 10,000 pounds per square inch and at a temperature of from 50° to 150° C., 3-thiocyanobutanone-2 with H₂S thereby to form 2-mercapto-4,5-dimethylthiazole and, recovering said thiazole.

JAMES T. GREGORY.

No references cited.